US007003049B2

(12) United States Patent
Hietala

(10) Patent No.: US 7,003,049 B2
(45) Date of Patent: Feb. 21, 2006

(54) FRACTIONAL-N DIGITAL MODULATION WITH ANALOG IQ INTERFACE

(75) Inventor: Alex Wayne Hietala, Phoenix, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 814 days.

(21) Appl. No.: 09/879,806

(22) Filed: Jun. 12, 2001

(65) Prior Publication Data

US 2003/0031267 A1 Feb. 13, 2003

(51) Int. Cl.
H04L 27/04 (2006.01)
H03C 3/00 (2006.01)

(52) U.S. Cl. .................. 375/295; 375/302; 375/309
(58) Field of Classification Search ........... 375/295, 375/302, 316–352, 296, 303, 308, 306; 341/155–172
See application file for complete search history.

(56) References Cited

U.S. PATENT DOCUMENTS

| | | | |
|---|---|---|---|
| 3,538,450 A | 11/1970 | Andrea et al. ............... 331/10 |
| 4,609,881 A | 9/1986 | Wells ......................... 331/1 A |
| 4,875,046 A | 10/1989 | Lewyn ........................ 341/148 |
| 4,920,282 A | 4/1990 | Muraoka ..................... 307/442 |
| 4,953,187 A | 8/1990 | Herold ......................... 337/48 |
| 4,965,474 A | 10/1990 | Childers et al. ............. 307/542 |
| 4,965,531 A | 10/1990 | Riley .......................... 331/1 A |
| 4,991,187 A | 2/1991 | Herold ......................... 337/48 |
| 5,022,054 A | 6/1991 | Wang ........................... 375/64 |
| 5,038,117 A | 8/1991 | Miller ........................ 331/16 |
| 5,055,800 A | 10/1991 | Black ......................... 331/1 A |
| 5,055,802 A | 10/1991 | Hietala ....................... 331/16 |
| 5,058,427 A | 10/1991 | Brandt ........................ 73/384 |
| 5,068,875 A | 11/1991 | Quintin ....................... 375/78 |
| 5,070,310 A | 12/1991 | Hietala ....................... 331/1 A |
| 5,079,522 A | 1/1992 | Owen .......................... 331/16 |
| 5,093,632 A | 3/1992 | Hietala ....................... 331/1 A |
| 5,111,162 A | 5/1992 | Hietala ....................... 332/127 |
| 5,117,206 A | 5/1992 | Imamura ..................... 331/158 |
| 5,166,642 A | 11/1992 | Hietala ....................... 331/1 A |
| 5,235,335 A | 8/1993 | Hester et al. ............... 341/172 |
| 5,281,865 A | 1/1994 | Yamashita .................. 307/279 |
| 5,301,367 A | 4/1994 | Heinonen .................... 455/76 |
| 5,337,024 A | 8/1994 | Collins ....................... 332/127 |
| 5,341,033 A | 8/1994 | Koker ......................... 307/290 |

(Continued)

OTHER PUBLICATIONS

Dunning et al., "An All-Digital Phase-Locked Loop with 50-Cycle Lock Time Suitable for High-Performance Microprocessors," IEEE Journal of Solid-State Circuits, vol. 30, No. 4, Apr. 1999, pp. 412-422.

(Continued)

Primary Examiner—Chieh M. Fan
Assistant Examiner—Jason M. Perilla
(74) Attorney, Agent, or Firm—Withrow & Terranova, PLLC

(57) ABSTRACT

Digital I and Q (NRZ) data streams are generated by specially configured conversion circuits, the outputs of which are applied to a F-N synthesizer to modulate the synthesizer. All illustrative conversion circuit employs a system of comparators to detect the state of analog I and Q signals at each bit interval and to decode outputs of such comparators to determine the NRZ sequence that gave rise to detected states. Once so determined, these NRZ signals are applied to an F-N synthesizer in the same manner as NRZ signals. Advantageously, inputs to present inventive embodiments may be received either as analog or digital I and Q inputs, subject to selection between input modes using only a single binary input.

17 Claims, 7 Drawing Sheets

U.S. PATENT DOCUMENTS

| | | | |
|---|---|---|---|
| 5,365,548 A | 11/1994 | Baker | 375/62 |
| 5,493,700 A | 2/1996 | Hietala | 455/75 |
| 5,493,715 A | 2/1996 | Humphreys et al. | 455/264 |
| 5,495,206 A | 2/1996 | Hietala | 331/1 A |
| 5,552,738 A | 9/1996 | Ko | 327/203 |
| 5,563,532 A | 10/1996 | Wu et al. | 327/34 |
| 5,592,114 A | 1/1997 | Wu | 327/208 |
| 5,684,795 A | 11/1997 | Daniel | 370/347 |
| 5,745,848 A | 4/1998 | Robin | 455/296 |
| 5,777,521 A | 7/1998 | Gillig | 331/16 |
| 5,778,028 A | 7/1998 | Turner | 375/229 |
| 5,822,366 A | 10/1998 | Rapeli | 375/219 |
| 5,825,257 A | 10/1998 | Klymyshyn | 332/100 |
| 5,857,004 A | 1/1999 | Abe | 375/344 |
| 5,859,890 A | 1/1999 | Shurboff | 377/48 |
| 5,883,930 A | 3/1999 | Fukushi | 375/376 |
| 5,892,385 A | 4/1999 | Hashiguchi | 327/333 |
| 5,898,330 A | 4/1999 | Klass | 327/210 |
| 5,900,758 A | 5/1999 | Kanno | 327/201 |
| 5,917,355 A | 6/1999 | Klass | 327/208 |
| 5,920,556 A | 7/1999 | Jorgensen | 370/350 |
| 5,933,038 A | 8/1999 | Klass | 327/208 |
| 5,943,613 A | 8/1999 | Wendelrup | 455/343 |
| 5,973,633 A | 10/1999 | Hester | 341/172 |
| 6,002,273 A * | 12/1999 | Humphreys | 327/3 |
| 6,002,356 A * | 12/1999 | Cooper | 341/160 |
| 6,008,703 A | 12/1999 | Perrott | 332/100 |
| 6,008,704 A | 12/1999 | Opsahl | 332/127 |
| 6,011,815 A * | 1/2000 | Eriksson et al. | 375/296 |
| 6,043,696 A | 3/2000 | Klass | 327/211 |
| 6,044,124 A * | 3/2000 | Monahan et al. | 375/376 |
| 6,047,029 A * | 4/2000 | Eriksson et al. | 375/247 |
| 6,060,927 A | 5/2000 | Lee | 327/218 |
| 6,064,272 A | 5/2000 | Rhee | 331/16 |
| 6,097,259 A | 8/2000 | Saito | 332/103 |
| 6,100,730 A | 8/2000 | Davis | 327/117 |
| 6,121,807 A | 9/2000 | Klass | 327/218 |
| 6,154,077 A | 11/2000 | Waible | 327/185 |
| 6,163,710 A | 12/2000 | Blaser | 455/552 |
| 6,275,083 B1 | 8/2001 | Martinez et al. | 327/218 |
| 6,323,709 B1 | 11/2001 | Kulkarni et al. | 327/195 |
| 6,380,809 B1 * | 4/2002 | Camp, Jr. | 331/17 |

OTHER PUBLICATIONS

Kral et al., "RF-CMOS Oscillators with Switched Tuning," Proceedings of the IEEE 1998 Custom Integrated Circuits Conference, May 1998, pp. 555-558.

Miller, Brian and Conley, Robert J., "A Multiple Modulator Fractional Divider," IEEE Transactions on Instrumentation and Measurement, vol. 40, No. 3, Jun. 1991, pp. 578-583.

Wilson et al., "A CMOS Self-Calibrating Frequency Synthesizer," IEEE Journal of Solid-State Circuits, vol. 35, No. 10, Oct. 2000, pp. 1437-1444.

Chang, Byngsoo, et al. "A 1.2 GHz CMOS Dual-Modulus Prescaler Using New Dynamic D-Type Flip-Flops," IEEE Journal of Solid-State Circuits, vol. 31, No. 5, May, 1996, pp. 749-752.

Huang, Qiuting, and Rogenmoser, Robert, "Speed Optimization of Edge-Triggered CMOS Circuits for Gigahertz Single-Phase Clocks," IEEE Journal of Solid-State Circuits, vol. 31, No. 3, Mar., 1996, pp. 456-465.

Motorola Semiconductor Technical Data, "The Technique of Direct Programming by Using a Two-Modulus Prescaler," Originally printed May 1981, reformatted Oct. 1995, Document No. AN827/D.

Pohjonen, H. and Ronkainen, H., "A 1 GHz CMOS Prescaler for RF Synthesizers," 1988 Proceedings of ISCAS, pp. 377-380, CH2458-8/88/0000-0377.

Rogenmoser, R. et al., "1.57 GHz Asynchronous and 1.4 GHz Dual-Modulus 1.2 micrometer CMOS Prescalers," IEEE Customer Integrated Circuits Conference, 1994, pp. 387-390, 0-7803-1886-2/94.

Yang, Ching-Yuan, and Liu, Shen-Iuan, "Fast-Switching Frequency Synthesizer with a Discriminator-Aided Phase Detector," IEEE Journal of Solid-State Circuits, vol. 35, No. 10, Oct. 2000, pp. 1445-1452, 0018-9200/00.

Yuan, Jiren, and Svensson, Christer, "High-Speed CMOS Circuit Technique," IEEE Journal of Solid-State Circuits, vol. 24, No. 1, Feb. 1989, pp. 62-70, 0018-9200/89.

Yuan, Jiren and Svensson, Christer, "New Single-Clock CMOS Latches and Flipflops with Improved Speed and Power Savings," IEEE Journal of Solid-State Circuits, vol. 32, No. 1, Jan. 1997, pp. 62-69, 0018-9200/97.

Razavi, Behzad, "RF Microelectronics," Prentice Hall PTR, Upper Saddle River, NJ, 1998.

* cited by examiner

FRACTIONAL-N DIGITAL MODULATION WITH ANALOG IQ INTERFACE

RELATED APPLICATIONS

The present application is related to concurrently filed non-provisional applications:

(i) by S. R. Humphreys and A. W. Hietala entitled Fractional-N Synthesizer with Improved Noise Performance;

(ii) by B. T. Hunt and S. R. Humphreys entitled Dual-Modulus Prescaler;

(iii) by S. R. Humphreys and A. W. Hietala entitled Accumulator with Programmable Full-Scale Range; and (iv) by B. T. Hunt and S. R. Humphreys entitled True Single-Phase Flip-Flop; which non-provisional applications are assigned to the assignee of the present invention, and are hereby incorporated in the present application as if set forth in their entirety herein.

FIELD OF THE INVENTION

The present invention relates to digital modulation systems and methods. More particularly, the present invention relates to F-N digital modulation systems having an analog interface receiving baseband in-phase and quadrature data signals.

BACKGROUND OF THE INVENTION

Phase-locked loop (PLL) frequency synthesis is a well-known technique for generating a variety of signals of predetermined frequency in many applications, e.g., digital radiotelephone systems. Briefly, the output of a voltage-controlled oscillator (VCO) is coupled to a frequency divider for providing one input to a phase detector. Another input to the phase detector is a reference signal from a fixed frequency source having high stability over a range of operating conditions. Differences in phase determined by the phase detector (typically reflected as charge pulses) are then filtered and applied to the VCO to control changes to the frequency of the VCO of such magnitude and sign as to reduce the detected phase difference.

Fractional-N (F-N) synthesizers based on the above-described PLL frequency synthesis techniques have been in favor for some time because, inter alia, they provide for non-integer division of the VCO output, thereby providing greater flexibility in choosing VCO outputs, and allowing the use of higher frequency reference sources with the concomitant potential for wider bandwidth and faster loop locking times. Other aspects of F-N synthesizers are presented in incorporated patent application (i) cited above.

It is often necessary in radiotelephone systems to apply modulation to a synthesized carrier to generate a modulated carrier. In some applications it has proven useful to apply modulating signals to modify the value of a frequency divider in PLL synthesizers (including F-N synthesizers) to derive the desired carrier modulation. Some radiotelephone systems employ so-called I-Q modulators to impart modulation information to transmitted carrier signals. In such schemes digital data are typically converted into I and Q (in-phase and quadrature) analog signals that are applied to respective mixers, whose outputs are then combined to form a composite modulated signal. This composite signal is then mixed to the desired output frequency.

Gaussian Minimum Shift Keying (GMSK) modulation is an I-Q modulation technique used in many radiotelephone systems, including widely deployed GSM mobile systems. Some GMSK systems provide digital I-Q modulation in a configuration generally of the form shown in FIG. 1. There, a first (IF frequency) VCO 107 is controlled in a PLL comprising stable frequency source (e.g., crystal) 100 to produce a reference frequency at the output of associated reference oscillator 101. The output of oscillator 101 is then conveniently divided in reference divider circuit 102 and applied as one input to phase detector 103. A second input to phase detector 103 is provided by loop divider 104 receiving the output from VCO 107. Phase detector 103 reflects any phase discrepancies between its inputs by supplying charge pump 105 with an appropriate pulse, which, after filtering in low-pass filter 106 is used to adjust the frequency of VCO 107. An output from VCO 107 is provided to quadrature network 109 for deriving respective I and Q components corresponding to the output of VCO 107.

Modulation inputs to the transmitter of FIG. 1 are presented in an illustrative parallel four-bit non-return-to-zero (NRZ) format to interface unit 110 for conversion to a serial format before being presented to phase mapping circuit 112. Mapping circuit 112 converts a serial input data stream into sequences of in-phase and quadrature phase pulses representative of the I and Q modulation components appearing on leads 113 and 114, respectively. In appropriate cases, mapping circuit 112 is realized as data-addressed I and Q read-only memories for producing input-data-controlled pulse sequences on respective circuit paths 113 and 114. These pulse sequences are then applied to respective digital filters 115 and 116, digital-to-analog converters (DACs) 117 and 118, and low pass smoothing filters 119 and 120 to provide analog pulses having shapes appropriate for QMSK modulation. See, for example, B. Razavi, *RF Microelectronics*, Prentice-Hall, 1998, especially pp. 150–152.

In many applications, relevant ones of circuit elements 110 through 120 will be found on a semiconductor chip that also includes a digital signal processor (DSP) or other source of modulating signals. In such cases serial interface 110 will not always be necessary, because the illustrative DSP (or other signal source) will provide modulating signals in appropriate form to drive phase mapping circuit 112 or equivalent functionality. In any event, elements 112 and 115 through 120 will advantageously function in close cooperation with a signal source (such as a DSP) to provide smoothed analog modulating signals at the outputs of filters 119 and 120.

Then, the smoothed I and Q pulse sequences are applied at respective mixers 121 and 122 to be combined with corresponding I and Q IF signals from VCO 107 via quadrature network 109. The mixed outputs from mixers 121 and 122 are then combined in well-known fashion in combiner 125, and, after IF bandpass filtering in filter 165, are applied to mixer 170, which also receives transmit carrier signals from VCO 160 connected in its associated PLL loop comprising loop divider 140, phase detector 135, charge pump 145 and loop filter 150. The second input to phase detector 135 is provided by oscillator 101 as modified by reference divider 130, as appropriate to particular frequencies employed. The finally mixed, GMSK-modulated carrier is further bandpass filtered in filter 180 before being applied to power amplifier 190 and thence to the transmit antenna.

As will be appreciated from a consideration of FIG. 1, prior art I-Q modulation techniques employ a variety of complex filtering, digital-to-analog conversions, and multiple PLL synthesizers necessitating complex circuitry and concomitant high power expenditure. Though direct digital interfacing to F-N synthesizers is possible, a predominant percentage of baseband modulation inputs presently available for use with F-N synthesizers (or other frequency sources) include only analog modulation inputs. Therefore, a digital modulator having reduced parts count, lower operating current and simplified operation, and which can accept analog I and Q data streams to control modulation in a F-N synthesizer is highly desirable. Moreover, modulators capable of accepting either analog or digital inputs are likewise desired in modulating F-N synthesizers.

SUMMARY OF THE INVENTION

Limitations of the prior are overcome and a technical advance is made in accordance with the present invention, typical embodiments of which are described below.

In accordance with illustrative embodiments, a digital NRZ data stream is generated by specially configured conversion circuits, the outputs of which are applied to a F-N synthesizer (along with channel selection and AFC signals) to modulate the output of the synthesizer. In one illustrative embodiment, a conversion circuit employs a system of comparators to detect the state of analog I and Q signals input signals at each bit interval and to decode outputs of such comparators to determine the NRZ sequence that gave rise to detected states. Once so determined, these NRZ signals are applied to an F-N synthesizer in the same manner as NRZ signals generated in baseband signal processing, which baseband NRZ signals are generally unavailable in current radiotelephone systems employing F-N synthesizers.

In accordance with another aspect of the present invention, modulation inputs may be received either as analog or (as available) digital I and Q inputs. Selection between input modes is illustratively made using only a single binary control signal. In either mode, modulation inputs are advantageously processed for delivery to a F-N synthesizer.

BRIEF DESCRIPTION OF THE DRAWING FIGURES

The above-summarized invention will be more fully understood upon consideration of the following detailed description and the attached drawing wherein.

DETAILED DESCRIPTION

The following detailed description presents illustrative embodiments of the present invention. Those skilled in the art will discern alternative system and method embodiments within the spirit of the present invention, and within the scope of the attached claims, from consideration of the present inventive teachings.

Figure 1:
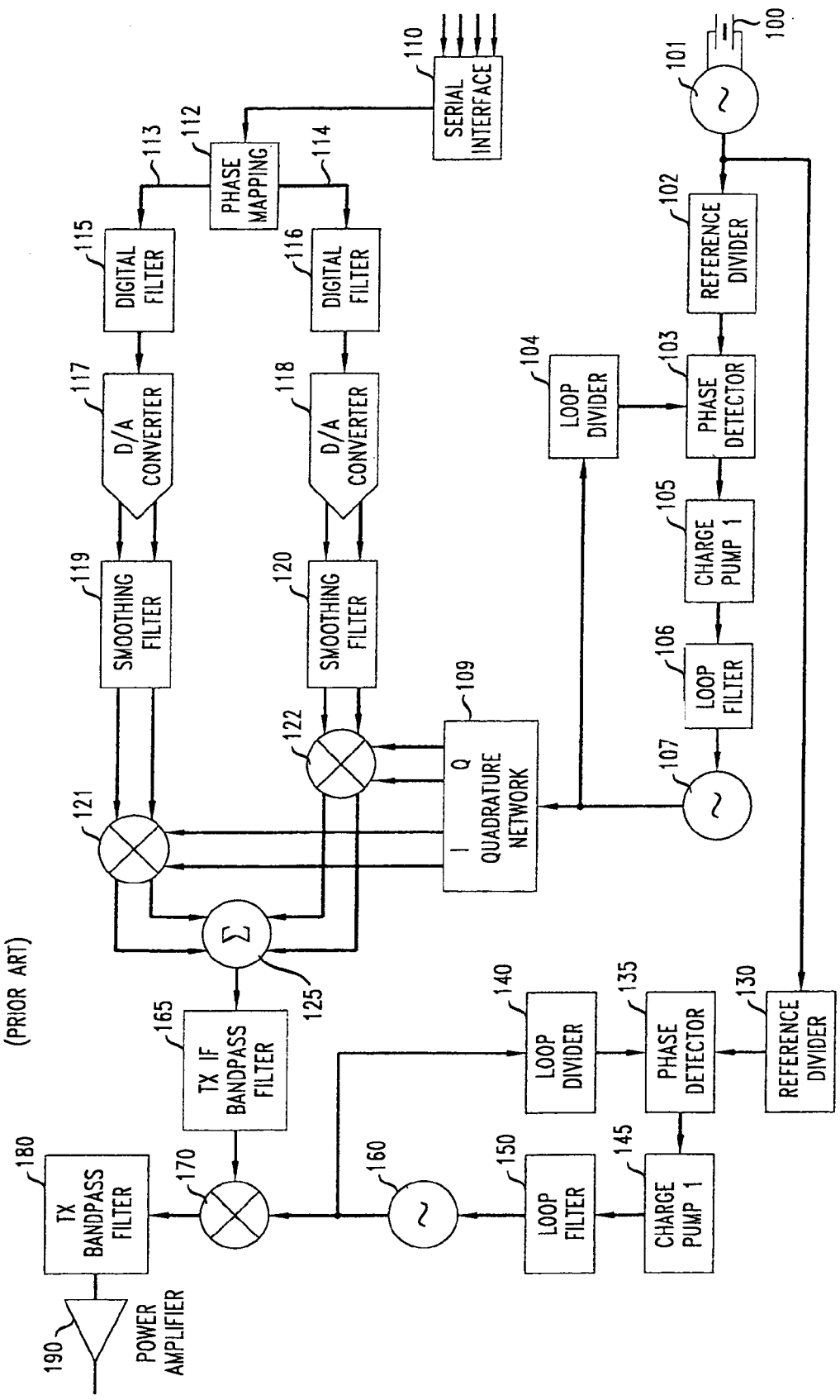
FIG. 1 shows a prior art I-Q analog modulator.
Figure 2:
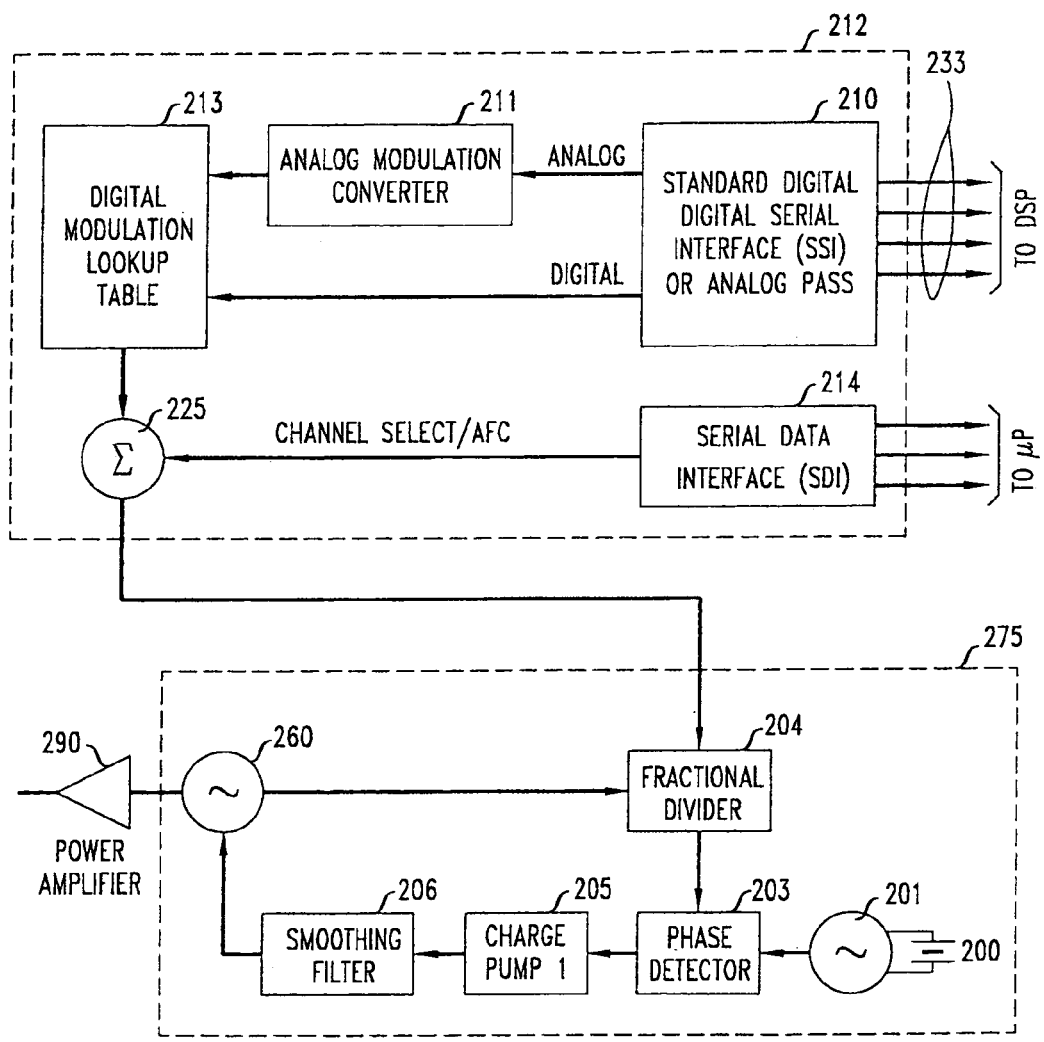
FIG. 2 shows an overall view of an illustrative embodiment of the present invention.

FIG. 2 shows an overall view of an illustrative RF transmitter circuit in accordance with one aspect of the present invention. The transmitter circuit of FIG. 2 includes a modulator circuit 212 comprising serial interface 210 receiving serial digital input signals (one bit at a time) from a source of modulation signals on one of leads 233. Other digital inputs will typically include clock and sync inputs, as is well known in the art. In the context of a mobile radiotelephone, such digital modulation signals will typically originate with a digital signal processor (DSP) or other circuitry for performing well-known compression and coding operations on input speech and data signals to produce baseband modulation signals.

For the case of an illustrative digital input on leads 233, serial interface 210 transfers data bits on its digital output to F-N synthesizer 275 by way of a suitable digital interface. In one illustrative embodiment, such a digital interface will assume the form of a digital modulation lookup table 213. Illustratively, a digital interface in such lookup table form receives a current NRZ data bit and uses it in combination with three or more past NRZ data bits to define a modulation word (e.g., a 24-bit word) to be presented to F-N synthesizer 275.

In the more common case of analog modulation inputs to converter 211, illustrative embodiments of the present invention receive analog signal input sequences and generate corresponding digital signals for use (after passing by way of a digital interface 213 and adder 225) in appropriately modifying the operation of F-N synthesizer 275. A table lookup approach to providing digital modulation words in unit 213 will again advantageously be used, as for the case of digital inputs.

F-N synthesizer 275 shown in FIG. 2 comprises VCO 260, fractional divider 204, phase detector 203 (receiving reference input from VCO 201 based on reference source 200), charge pump 205 and loop filter 206. The output of the (modulated) carrier from VCO 260 is applied to power amplifier 290 for transmission over an associated antenna, as is well known.

While details of effecting modulation of the output of VCO 260 in response to modulation signals from a digital modulation interface (illustratively shown as 213 in FIG. 2) are not essential to an understanding of the present invention, it will be recognized that known techniques for achieving this result include employing digital outputs of a digital modulation interface to address an appropriate segment of a lookup table for generating signals (e.g., frequency offset words) for input to fractional divider 204 of F-N synthesizer 275 as a function of time. Other background aspects of digital modulation that will prove generally useful in the present inventive contexts will be found in U.S. Pat. No. 5,079,522 issued to Owen, et al., Jan. 7, 1992.

Adder 225 in FIG. 2 is also shown receiving channel select and automatic frequency control signals from serial interface 214. These inputs are used, with modulation signals from converter 211, to modify the value of fractional divider 204, thereby to define the frequency output of VCO 260 for transmission via power amplifier 290. Because channel select and automatic frequency control aspects of modifying F-N synthesizer 275 are well known, these aspects will not be further described in the sequel. For additional background see, for example, U.S. Pat. No. 4,121,162 issued to Alberkrack, et al.

As will be described in greater detail below, conversion circuitry and methods in accordance with the present invention allow RF transmitters in radiotelephone and related contexts to accept standard analog IQ modulation signals from existing interfaces while using F-N synthesis to directly generate GMSK or other transmitted signals. Before considering such conversion circuits and methods in detail, however, it proves useful to consider the nature of GMSK signals generally, and then to consider how input analog modulating signals can be converted to a NRZ digital format for use with a F-N synthesizer.

GMSK Constellation and Signaling

Figure 3:
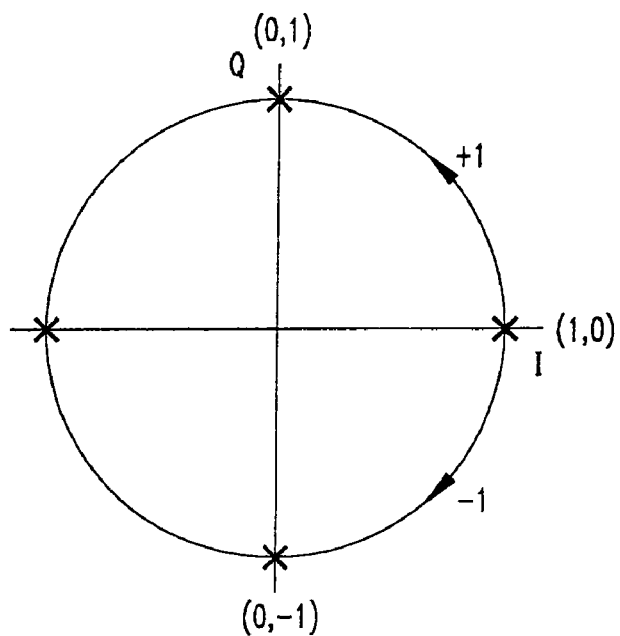
FIG. 3 shows the signal constellation for GMSK modulation.

GMSK is a constant envelope form of modulation with four constellation points—as shown in FIG. 3. As each new symbol is received, the phase of the modulated signal must move clockwise or counter-clockwise by 90 degrees. Transitions across the center of the circle of the constellation are not allowed. If the phasor representing this modulation process is decomposed into an I (in-phase) component and a Q (quadrature) component, then each of these components must be zero for alternate symbol intervals; when one of these components is zero, the other component is either −1 or +1. Further, if the state of I and Q can be determined at each time interval to be either −1, 0, or +1, then the bit that caused the transition from the previous state to the present state can be determined. That is, a conversion from input analog modulation signals to digital NRZ modulation bits can be determined. Table I presents the possible transitions between states and the corresponding input data bit that caused such a transition.

TABLE I

| State N | State N + 1 | Input Bit |
|---------|-------------|-----------|
| I = 0, Q = 1 | I = 1, Q = 0 | −1 |
| I = 0, Q = 1 | I = −1, Q = 0 | +1 |
| I = 1, Q = 0 | I = 0, Q = −1 | −1 |
| I = 1, Q = 0 | I = 0, Q = 1 | +1 |
| I = 0, Q = −1 | I = −1, Q = 0 | −1 |
| I = 0, Q = −1 | I = 1, Q = 0 | +1 |
| I = −1, Q = 0 | I = 0, Q = 1 | −1 |
| I = −1, Q = 0 | I = 0, Q = −1 | +1 |

When the input bit pattern corresponding to the I and Q transitions has been determined, this bit pattern is fed to the F-N synthesizer modulation input port.

Figure 4:
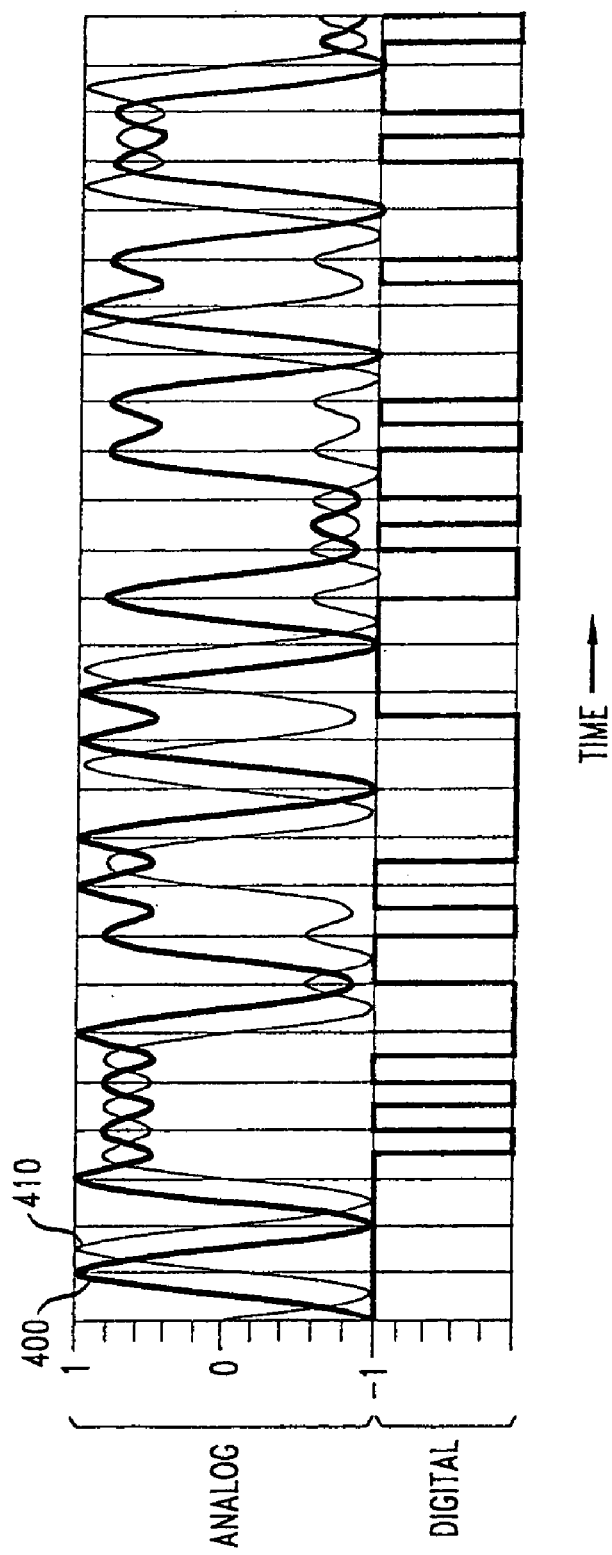
FIG. 4 shows an illustrative GMSK NRZ signal pattern and analog waveforms corresponding to such NRZ signals.

FIG. 4 shows illustrative normalized analog I and Q waveforms (400 and 410, respectively), including representative transitions in the upper part of that figure. The corresponding (time shifted) digital bit sequence is shown at the bottom of FIG. 4. From this plot it can be seen, for example, that a pattern of 0101 or 1010 results in I and Q waveforms that vary in magnitude (normalized to maximum magnitudes of 1.0) from 0.52 to 0.85 (or −0.52 to −0.85). In this case, then, a level of 0.85 corresponds to a +1 (−0.85 corresponds to −1) and levels of +/−0.52 corresponds to a 0. From the example of FIG. 4 it becomes clear that input data patterns consisting of strings of 0 or 1 show clear −1, 0, or +1 points at each bit time. It will be recognized that different particular maximum amplitudes may be presented as outputs of particular DSPs (or other source) of analog modulation signals. It therefore proves advantageous to receive additional input signals defining positive and negative threshold values for a particular context. In the discussion of an illustrative converter circuit in connection with FIG. 6, such threshold values are conveniently set using inputs on leads TX_THP and TX_THN for positive and negative threshold values, respectively. Such threshold values will be set based on prescribed output levels for a particular source of analog modulating signals.

Based on the nature of input I and Q signals shown in FIG. 4, it proves advantageous in converting from analog to digital signals to set up a system of level comparators based on the I and Q signals with appropriate thresholds, and to set up a digital decoding system for processing comparator outputs. In particular, relevant states of either the I or Q channel can be determined by two comparators, for a total of four comparators for both channels. Each comparator advantageously has a threshold of +/−0.7*(maximum input level).

Figure 5:
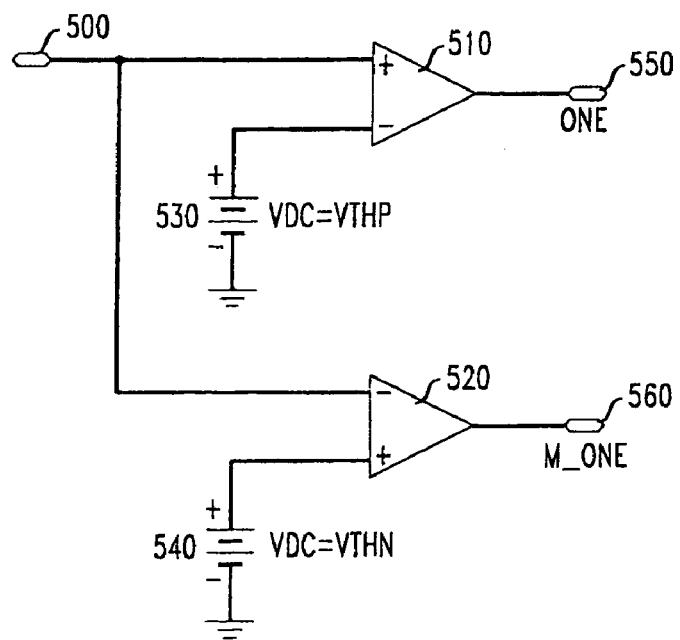
FIG. 5 shows an illustrative comparator arrangement useful in some embodiments of the present invention.

The circuit of FIG. 5 presents an illustrative comparison system used for each of the I and Q channels. There, an input on port 500 is applied to the +input of comparator 510 and the −input of comparator 520. Corresponding threshold voltages Vthp and Vthn are applied to the −terminal of comparator 510 and +terminal of comparator 520, respectively. If, in the circuit of FIG. 5, the port labeled "ONE" is high, then a +1 is present on the input 500. If the port labeled "M_ONE" is high, then a −1 is present on input 500. If neither port is high, then a 0 is present on the channel. Once logical representations of −1 and +1 have been realized, well-defined logic operations (to be discussed below) are used to derive the desired NRZ bit pattern. In performing such logic operations, it proves advantageous to represent the −1 value by logical one, and the +1 value by logical zero.

Figure 6:
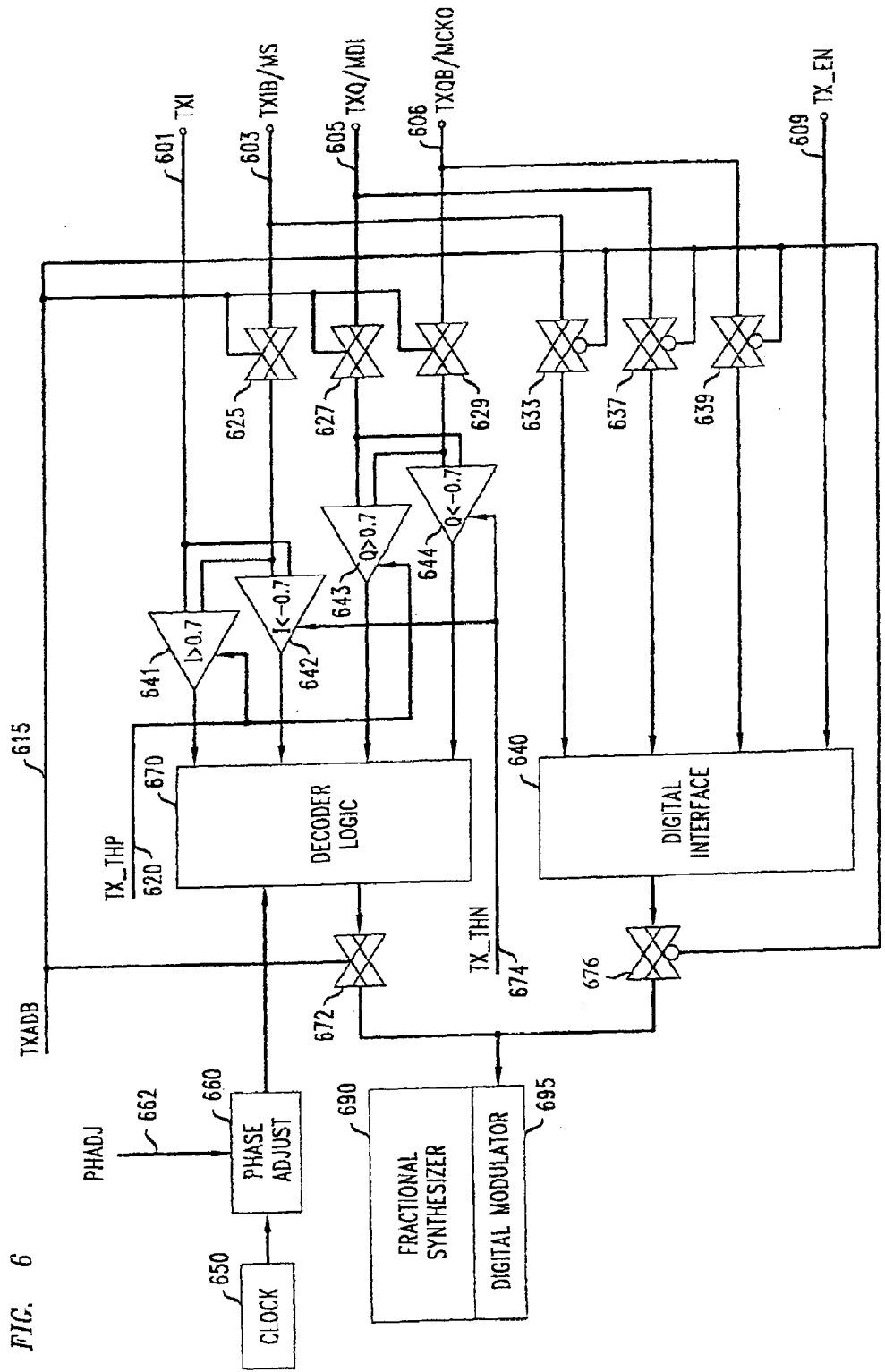
FIG. 6 shows an illustrative conversion circuit for developing modulation control signals for a F-N synthesizer in response to applied analog modulation signals.

FIG. 6 shows a functional representation of a generalized interface for accepting either digital or analog inputs for application to a digital modulator applying modulation to a F-N synthesizer. The configuration shown in FIG. 6 will prove useful for implementation on an integrated circuit, where interface signals will illustratively be applied on integrated circuit (IC) pins. Since both analog and digital modulation inputs will not be present at the same time, three of the interface pins will be shared between analog and digital interfaces. In particular, the TXIB, TXQ and TXQB analog input pins (603, 605 and 606) are advantageously shared with the MS, MDI and MCKO digital input signals. It proves advantageous in the illustrative circuit of FIG. 6 to provide analog input signals for the I and Q channels as pairs of differential signals (TXI and TXIB, TXQ and TXQB) to avoid possible absolute DC center reference issues.

In one illustrative mode of operation, a high level on the TXADB input pin causes the illustrative interface of FIG. 6 to operate in the analog mode. Thus, TXI is enabled, TXIB is enabled (while MS, the frame sync digital output is disabled), TXQ is enabled (MDI, the digital symbol input is disabled), and TXQB is enabled (while MCKO, the symbol clock output is disabled). When low, the interface operates in the digital mode with TXI, TXIB, TXQ, and TXQB inactive. Because analog inputs are currently more prevalent, it proves convenient to program a high value for TXADB in most cases.

Switches 633, 637 and 639 are illustratively inhibited when a high level is present on TXADB, while switches 625, 627 and 629 are operative to connect respective analog inputs TXIB (on 603), TXQ (on 605) and TXQB (on 606) to comparators 641–644 as shown in FIG. 6. The TXI input (on 601) is also applied to comparators 641 and 642. More particularly, the I analog inputs (on 601 and 603) are tested in comparators 641 and 642 against threshold values provided on leads TX_THP and TX_THN to determine if I >0.7 or I<−0.7, with outputs of comparators 641–644 being provided to decode logic 670. Likewise, Q analog inputs (on 605 and 606) are tested in comparators 643 and 644 against threshold values TX_THP and TX_THN to determine whether Q>0.7 or Q<−0.7, with outputs of the comparators again being provided to decode logic 670. As noted above, values for thresholds may vary with particular sources of analog modulation signals. An illustrative circuit arrangements for realizing decode logic 670 is described below.

Clock 650 and phase adjust circuit 660 (the latter receiving phase adjust inputs on input 662) clock decode logic in a manner to select outputs of decode logic 670 at appropriate times for determining +1 and −1 NRZ values based on analog inputs on inputs 601, 603, 605, and 606. It will be seen that a high level on TXADB again inhibits connection through switch 676 of digital interface 640 to the digital modulator 695 associated with F-N synthesizer 690. A high level on TXADB permits the output of decode logic 670 to apply modulation inputs to digital modulator 695. TX_EN input 609 is conveniently used to selectively enable (start and stop) modulation operations in the circuit of FIG. 6.

The following additional serial interface bits not expressly shown in FIG. 6 are also advantageously added to an illustrative IC package embodying illustrative embodiments of the present invention:

PHADJ[5:0], where the bracketed 5:0 indicates a 6-bit data path (with bit 5 being the most significant, and bit 0 being the least significant), selects the phase of the symbol clock used in making I and Q threshold decisions, in increments of a system clock (e.g., a 13 MHz clock). In some embodiments it proves convenient to have 48 possible states. Thus a choice will be made in determining a correct setting of the phase relative for a particular radio in use. However, a particular setting will generally be identical for all radios based on a specific hardware platform.

TX_THP[3:0] Sets the positive threshold of the differential I and Q channel comparison. For illustrative analog inputs described above this will be set to 0.7 times the peak I or Q voltage. Since the peak voltage changes with radio platform hardware this threshold is advantageously made programmable over a range from 0.10V to 0.85V in 0.05V steps. Again, a design choice will be made in determining a correct setting of the positive threshold that will be used for all radios using a particular hardware platform.

One illustrative set of program selection will be:

| | | | |
|---|---|---|---|
| 0000 0.10 V; | 0001 0.15 V; | 0010 0.20 V; | 0011 0.25 V; |
| 0100 0.30 V; | 0101 0.35 V; | 0110 0.40 V; | 0111 0.45 V; |
| 1000 0.50 V; | 1001 0.55 V; | 1010 0.60 V; | 1011 0.65 V; |
| 1100 0.70 V; | 1101 0.75 V; | 1110 0.80 V; | 1111 0.85 V; |

TX_THN[3:0] Sets the negative threshold of the differential I and Q channel comparison. For illustrative analog inputs described above this will be set to −0.7 times the peak I or Q voltage. Since the peak voltage changes with radio platform hardware this threshold is advantageously made programmable over arrange from −0.10V to −0.85V in 0.05V steps. Again, a design choice will be made in determining a correct setting of the negative threshold that will be used for all radios using a particular hardware platform. One illustrative set of program selection will be:

| | | | |
|---|---|---|---|
| 0000 −0.10 V; | 0001 −0.15 V; | 0010 −0.20 V; | 0011 −0.25 V |
| 0100 −0.30 V; | 0101 −0.35 V; | 0110 −0.40 V; | 0111 −0.45 V |
| 1000 −0.50 V; | 1001 −0.55 V; | 1010 −0.60 V; | 1011 −0.65 V |
| 1100 −0.70 V; | 1101 −0.75 V; | 1110 −0.80 V; | 1111 −0.85 V |

As will be appreciated from the preceding discussion of FIG. 6, differential analog I and Q signals on inputs 601, 603, 605 and 606 are advantageously converted into digital values of −1, 0, and +1. These signals are then applied to decoder logic circuitry 670 where, along with stored results from prior decoding, they are used to determine whether the input NRZ data was a +1 or a −1, represented by logical 0 and logical 1, respectively. The output of decode logic 1 is therefore a serial (one-bit wide) stream for application to digital modulator 695 in FIG. 6.

Figure 7:
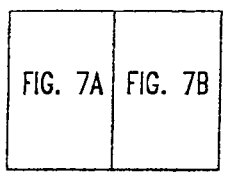
FIG. 7 shows an illustrative decoding circuit for generating NRZ bit pattern signals in response to applied thresholded signals having +1 and −1 values.
Figure 7A:
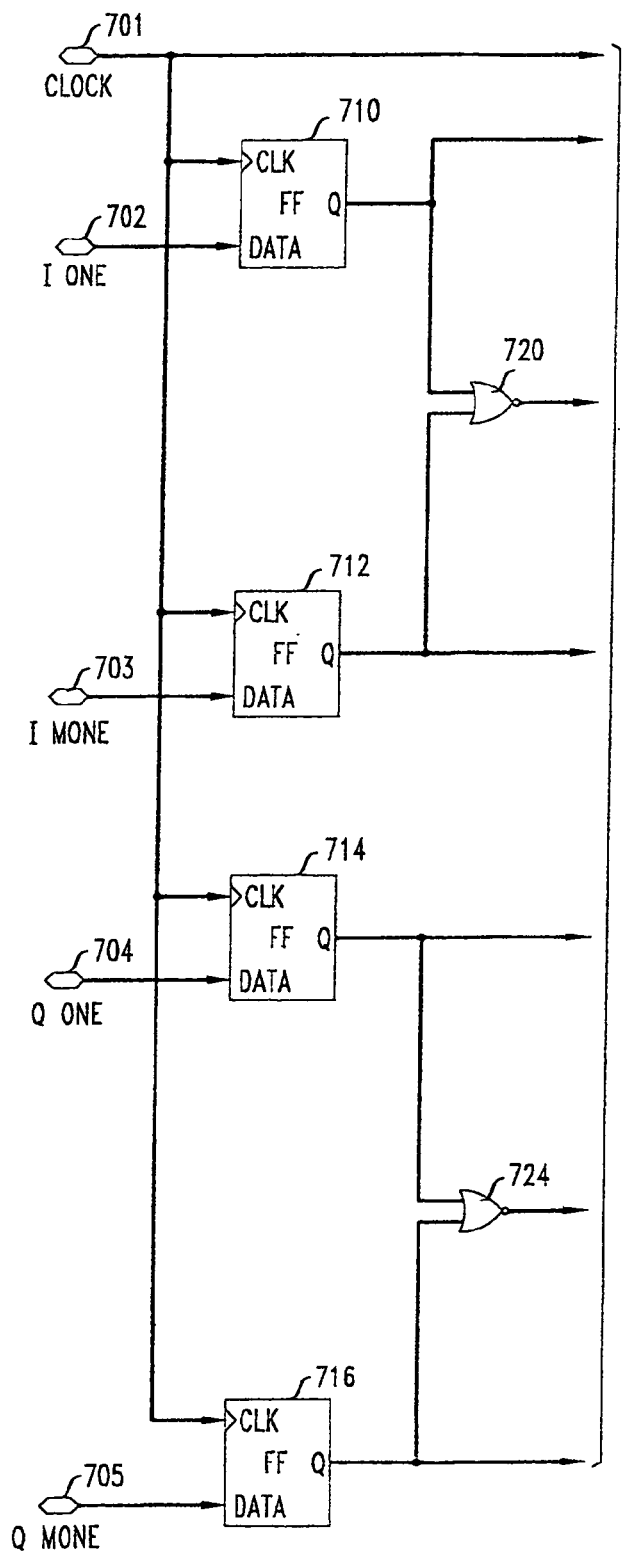
Figure 7B:
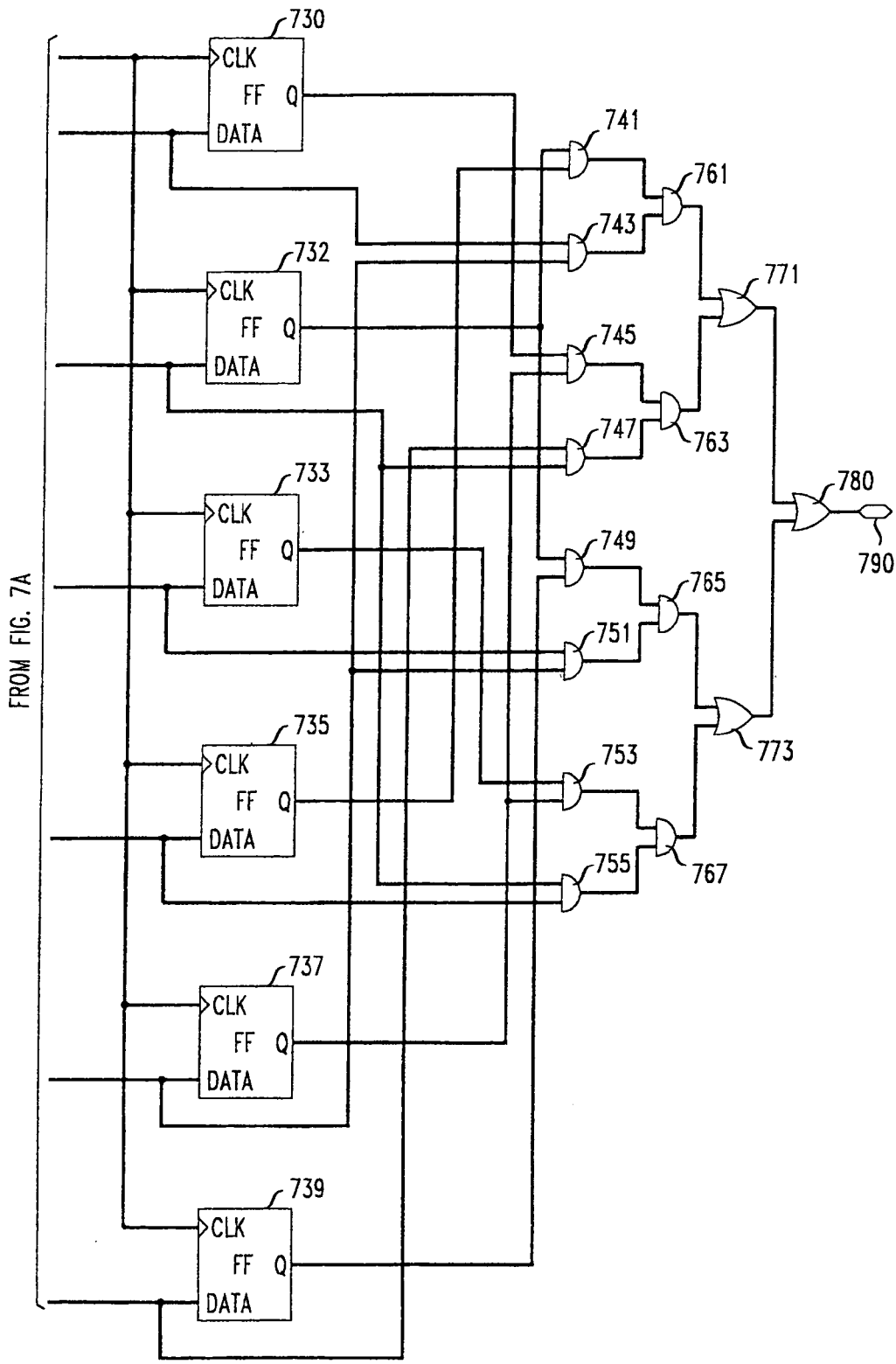

FIG. 7, comprising FIGS. 7A and 7B, shows inputs on leads I ONE, I MONE, Q ONE and Q MONE inputs on leads 702, 703, 704 and 705, respectively being clocked into corresponding flip-flops 710, 712, 714 and 716. Results of prior decodings of inputs on input leads 702, 703, 704 and 705 during immediately preceding bit periods are stored in flip-flops 730, 732, and 733 (for I inputs) and 735, 737 and 739 (for Q inputs). As discussed above in connection with FIG. 5, outputs from comparator pairs (say for I inputs) are: I ONE=high for a +1 analog input, I MONE=high for a −1 and a 0 when neither I ONE nor I MONE is high. The same relationships exist for Q inputs.

Thus, when I ONE is high (indicating a +1 I input), flip-flop 710 has a logical 1 clocked into it for a current bit interval. Then, during the following bit interval, that 1 is clocked into flip-flop 730. Others of the inputs one 703–705 provide similar results in respective flip-flops 712 (and 733), 714 (and 735) and 716 (and 739). Thus, for example, a high level on Q MONE (indicating a −1 Q input) gives rise to a logical 1 being clocked into flip-flop 716 during a current bit interval, which logical 1 is clocked into flip-flop 739 during the following bit interval. When neither I ONE nor I MONE is high for a current bit interval (indicating a 0 I input), then both of flip-flops 710 and 712 will have a logical 0 clocked into it for the current bit interval. Then, NOR gate 720 will receive two logical 0s and will provide a logical 1 at its output to be clocked into flip-flop 732 during the following bit interval. The same logical functioning applies to a 0 Q input, with NOR gate 724 providing a 1 that is clocked into flip-flop 737. Gates 741 through 780 then combine the signals for current and past bit intervals in accordance with Table I to produce the above-described 1-bit sequence of binary digital signals (logical 0 and 1 representing +1 and −1, respectively) for input to digital modulator 695 in FIG. 6.

While the above-described conversion and decoding techniques have been described in a particularly useful context of analog modulation inputs commonly associated with GMSK modulation processing, those skilled in the art will recognize that such techniques will also find application in other constant envelope digital modulation contexts. Thus, for example, the well-known Bluetooth radio systems will also employ present inventive teachings to advantage.

What is claimed is:

1. A method for modulating a fractional-N synthesizer (F-N synthesizer) in response to applied sequences of in-phase (I) and quadrature (Q) analog modulation signals, said F-N synthesizer comprising a loop divider having a variable fractional divisor, the method comprising:

comparing said sequence of I analog modulation signals with a first plurality of threshold values at successive time intervals, thereby to generate a sequence of I digital output signals, said sequence of I digital output signals corresponding to respective relationships between said sequence of I analog modulation signals and said first plurality of threshold values at said successive time intervals;

comparing said sequence of Q analog modulation signals with a second plurality of threshold values at successive time intervals, thereby to generate a sequence of Q digital output signals, said sequence of Q digital output signals corresponding to respective relationships between said sequence of Q analog modulation signals and said second plurality of threshold values at said successive time intervals;

transforming said sequences of I and Q digital output signals into a sequence of digital modulation signals in accordance with a predetermined relationship between values of said sequences of I and Q digital output signals over consecutive time intervals; and modifying said variable fractional divisor in accordance with said sequence of digital modulation signals.

2. The method of claim 1 wherein:

said first plurality of threshold values comprises a threshold value equal to a predetermined function of a maximum absolute value of positive peak values for said sequence of I analog modulation signals and a threshold value equal to a predetermined function of a maximum absolute value of negative peak values for said sequence of I analog modulation signals; and said second plurality of threshold values comprises a threshold value equal to a predetermined function of a maximum absolute value of positive peak values for said sequence of Q analog modulation signals and a threshold value equal to a predetermined function of a maximum absolute value of negative peak values for said sequence of Q analog modulation signals.

3. The method of claim 2 wherein:

said first plurality of threshold values comprises a value substantially equal to 0.7 times the positive peak value of said sequence of I analog modulation signals, and a value substantially equal to 0.7 times the negative peak value of said sequence of I analog modulation signals; and said second plurality of threshold values comprises a value substantially equal to 0.7 times the positive peak value of said sequence of Q analog modulation signals, and a value substantially equal to 0.7 times the negative peak value of said sequence of Q analog modulation signals.

4. The method of claim 1 wherein:

said sequence of I digital output signals comprises at least three values;

said sequence of Q digital output signals comprises at least three values; and wherein said predetermined relationship between values of said sequence of I digital output signals and said sequence of Q digital output signals over consecutive time intervals comprises a predetermined relationship between said sequences of I and Q digital output signals over two consecutive time intervals.

5. The method of claim 4 wherein said sequences of I and Q analog modulation signals are Gaussian Minimum Shift Keyed (GMSK) modulation signals.

6. The method of claim 5 wherein said at least three values for said sequence of I digital output signals and said at least three values for said sequence of Q digital output signals are each represented as +1, 0, and −1; and wherein for states N and N+1 corresponding to values for said sequence of I digital output signals and said sequence of Q digital output signals in respective consecutive time intervals, said sequence of digital modulation signals are given by:

| State N | State N + 1 | Digital Modulation Signal |
|---|---|---|
| I = 0, Q = 1 | I = 1, Q = 0 | −1 |
| I = 0, Q = 1 | I = −1, Q = 0 | +1 |
| I = 1, Q = 0 | I = 0, Q = −1 | −1 |
| I = 1, Q = 0 | I = 0, Q = 1 | +1 |
| I = 0, Q = −1 | I = −1, Q = 0 | −1 |
| I = 0, Q = −1 | I = 1, Q = 0 | +1 |
| I = −1, Q = 0 | I = 0, Q = 1 | −1 |
| I = −1, Q = 0 | I = 0, Q = −1 | +1. |

7. In a radio transmitter having a fractional-N synthesizer (F-N synthesizer) comprising a loop divider having a variable fractional divisor, a method for generating digital modulation signals in response to input analog modulation signals comprising:

comparing said analog modulation signals at a plurality of successive time intervals with at least one undetermined threshold value to derive a sequence of digital values;

decoding said sequence of digital values to generate a corresponding sequence of digit modulation signals; and modifying said variable fractional divisor in accordance with said digital modulation signals, wherein said at least one predetermined threshold value comprises at least one value equal to a predetermined function of a peak value of said analog modulation signals, said at least one value equal to a predetermined function of a peak value comprises one positive threshold value equal to a predetermined percentage of a positive peak value of said analog modulation signals and one negative threshold value equal to a predetermined percentage of a negative peak value of said analog modulation signals.

8. The method of claim 7 wherein:

a first one of said sequence of digital values, represented as +1, is achieved when said analog modulation signals are greater than said positive threshold value at a predetermined time;

a second one of said sequence of digital values, represented as a −1, is achieved when said analog modulation signals are less than said negative threshold value at said predetermined time; and a third one of said sequence of digital values, represented as a 0, is achieved when neither of said first one or said second one is achieved.

9. In a radio transmitter having a fractional-N synthesizer (F-N synthesizer) comprising a loop divider having a variable fractional divisor, a method for generating digital modulation signals in response to input analog modulation signals comprising:

comparing said analog modulation signals at a plurality of successive time intervals with at least one predetermined threshold value to derive a sequence of digital values;

decoding said sequence of digital values to generate a corresponding sequence of digital modulation signals; and modifying said variable fractional divisor in accordance with said digital modulation signals;

said analog modulation signals comprise in-phase (I) analog modulation signals and quadrature (Q) analog modulation signals; and said comparing comprises comparing said I analog modulation signals and said Q analog modulation signals separately with respective predetermined threshold values to derive separate sequences of digital values corresponding to each of said I and Q analog modulation signals.

10. The method of claim 9 wherein said decoding comprises decoding said separate sequences of digital values corresponding to each of said I and Q analog modulation signals to generate said digital modulation signals.

11. A signal converter comprising:
an input circuit for receiving analog modulation signals comprising in-phase (I) and quadrature (Q) analog modulation signals;
for each of the in-phase (I) and quadrature (Q) analog modulation signals, at least one comparator for comparing said analog modulation signals with at least one threshold signal level to produce a first output digital signal when said analog modulation signals bear a first relationship to said at least one threshold signal level, and to produce a second output digital signal when said analog modulation signals bear a second relationship to said at least one threshold signal level;
a decoder for receiving said first and second output digital signals from said at least one comparator for each of said in-phase (I) and quadrature (Q) analog modulation signals and outputting digital modulation signals corresponding to said in-phase (I) and quadrature (Q) analog modulation signals; and
a divider circuit having a variable fractional divisor determined by said digital modulation signals.

12. The converter of claim 11 wherein said in-phase (I) and quadrature (Q) analog modulation signals comprise Gaussian Minimum Shift Keyed (GMSK) analog modulation signals.

13. The converter of claim 11 wherein said at least one threshold signal level comprises two threshold signal levels, a first of which comprises a function of a most positive value of said analog modulation signals, and a second of which comprises a function of a most negative value of said analog modulation signals.

14. The converter of claim 13 wherein said at least one comparator comprises comparators for comparing each of said analog modulation signals with each of said first and second threshold signal levels.

15. A signal converter comprising:
an input circuit for receiving analog modulation signals;
at least one comparator for comparing at least one of said analog modulation signals with at least one threshold signal level to produce a first output digital signal when said at least one analog modulation signal bears a first relationship to said at least one threshold signal level and to produce a second output digital signal when said at least one analog modulation signal bears a second relationship to said at least one threshold signal level;
a decoder for receiving said first and second output digital signals from said at least one comparator and outputting digital modulation signals corresponding to said analog modulation signals;

a divider circuit having a variable fractional divisor determined by said digital modulation signals, wherein said divider circuit is a loop divider in a fractional-N (F-N) synthesizer; and
a switch for applying said digital modulation signals from said decoder to said divider circuit.

16. A signal converter comprising:
an input circuit for receiving analog modulation signals;
at least one comparator for comparing at least one of said analog modulation signals with at least one threshold signal level to produce a first output digital signal when said at least one analog modulation signal bears a first relationship to said at least one threshold signal level and to produce a second output digital signal when said at least one analog modulation signal bears a second relationship to said at least one threshold signal level;
a decoder for receiving said first and second output digital signals from said at least one comparator and outputting digital modulation signals corresponding to said analog modulation signals;
a divider circuit having a variable fractional divisor determined by said digital modulation signals, wherein said divider circuit is a loop divider in a fractional-N (F-N) synthesizer; and
a switch for applying digital modulation signals to said divider circuit from a source other than said decoder.

17. A signal converter comprising:
an input circuit for receiving analog modulation signals;
at least one comparator for comparing at least one of said analog modulation signals with at least one threshold signal level to produce a first output digital signal when said at least one analog modulation signal bears a first relationship to said at least one threshold signal level and to produce a second output digital signal when said at least one analog modulation signal bears a second relationship to said at least one threshold signal level;
a decoder for receiving said first and second output digital signals from said at least one comparator and outputting digital modulation signals corresponding to said analog modulation signals;
a divider circuit having a variable fractional divisor determined by said digital modulation signals, wherein said divider circuit is a loop divider in a fractional-N (F-N) synthesizer; and
a switch operating based on at least one control signal for applying digital modulation signals from:
said decoder to said divider circuit in response to a first state of said at least one control signal; and
a source other than said decoder to said divider circuit in response to a second state of said at least one control signal; and
wherein said first and second states of said at least one control signal are mutually exclusive.

* * * * *